(12) United States Patent
Busi et al.

(10) Patent No.: US 11,855,806 B2
(45) Date of Patent: Dec. 26, 2023

(54) NETWORK NODE AND DEVICE FOR DATA COMMUNICATION NETWORKS

(71) Applicant: Huawei Technologies Co., Ltd., Shenzhen (CN)

(72) Inventors: Italo Busi, Segrate (IT); Yi Lin, Dongguan (CN); Jia He, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 17/479,797

(22) Filed: Sep. 20, 2021

(65) Prior Publication Data

US 2022/0006672 A1 Jan. 6, 2022

Related U.S. Application Data

(63) Continuation of application No. PCT/CN2019/079163, filed on Mar. 22, 2019.

(51) Int. Cl.
*H04L 47/28* (2022.01)
*H04L 12/46* (2006.01)
*H04Q 11/00* (2006.01)

(52) U.S. Cl.
CPC .......... *H04L 12/4641* (2013.01); *H04L 47/28* (2013.01); *H04Q 11/0067* (2013.01)

(58) Field of Classification Search
CPC . H04B 10/03; H04B 10/0793; H04L 12/4641; H04Q 11/0067
See application file for complete search history.

(56) References Cited

U.S. PATENT DOCUMENTS 6,834,139 B1 12/2004 Prairie et al.
2016/0119076 A1\* 4/2016 Gareau .............. H04Q 11/0066
398/49

(Continued)

FOREIGN PATENT DOCUMENTS

CN 104412246 A 3/2015
CN 104869481 A 8/2015

(Continued)

OTHER PUBLICATIONS

Xiaobo et al., "Draft revised Recommendation ITU-TG.7712/Y.1703 (v4.08)," SG15-327/WP3, Study Group 15, XP044255895, ITU-T Draft; Study Period 2017-2020, total 111 pages, International Telecommunication Union, Geneva, Switzerland (Oct. 8-19, 2018).

(Continued)

*Primary Examiner* — Dzung D Tran
(74) *Attorney, Agent, or Firm* — Leydig, Voit & Mayer, Ltd.

(57) ABSTRACT

A network node for a Data Communication Network (DCN) and a network device for providing traffic to the DCN are provided. The network node is configured to receive a plurality of packets carrying DCN messages; determine, from the received packets, a first set of packets addressed to other network nodes of the DCN. The network node is then configured to forward the first set of packets over a Time-Division-Multiplexing (TDM) connection, in particular over an Optical Data Unit-k (ODUk) connection, to a determined network node of the DCN. According to the application, a high bandwidth efficiency is maintained, and the number of interfaces to be managed on a controller is reduced.

18 Claims, 12 Drawing Sheets

(56) References Cited

U.S. PATENT DOCUMENTS

| | | | |
|---|---|---|---|
| 2016/0234578 | A1 | 8/2016 | Sareen et al. |
| 2017/0201323 | A1* | 7/2017 | Prakash ............. H04Q 11/0001 |
| 2017/0223436 | A1* | 8/2017 | Moynihan .......... H04Q 11/0062 |
| 2018/0102834 | A1* | 4/2018 | Ibach ................... H04J 3/1652 |

FOREIGN PATENT DOCUMENTS

| | | |
|---|---|---|
| CN | 103595635 B | 8/2017 |
| CN | 107769939 A | 3/2018 |
| CN | 108243035 A | 7/2018 |
| EP | 2566118 A1 | 3/2013 |
| EP | 3057269 A1 | 8/2016 |
| WO | 2007121651 A1 | 11/2007 |

OTHER PUBLICATIONS

Andersson et al., "Framework for Layer 2 Virtual Private Networks (L2VPNs)," Network Working Group, Request for Comments: 4664, Total 47 pages (Sep. 2006).

"OpenFlow Switch Specification," Version 1.5.1 (Protocol version 0x06), ONF TS-025, Open Networking Foundation, pp. 1-283 (Mar. 26, 2015).

"IEEE Standard for Ethernet," IEEE Std 802.3-2018 (Revision of IEEE Std 802.3-2015), Sponsored by the LAN/MAN Standards Committee, IEEE Computer Society, Total 5600 pages (Jun. 14, 2018).

"Series Q: Switching and Signalling, Q3 interface, Lower layer protocol profiles for the Q and X interfaces," ITU-T Recommendation Q.811, ITU-T Telecommunication Standardization Sector of ITU, Total 46 pages, International Telecommunication Union, Geneva, Switzerland (Feb. 2004).

Plummber "An Ethernet Address Resolution Protocol—or—Converting Network Protocol Addresses to 48.bit Ethernet Address for Transmission on Ethernet Hardware," Network Working Group, Request for Comments: 826, Total 10 pages (Nov. 1982).

Simpson "PPP in HDLC-like Framing," Network Working Group, Request for Comments: 1662, Total 27 pages (Jul. 1994).

"Series G: Transmission Systems and Media, Digital Systems and Networks, Digital networks—Optical transport networks, Optical transport network: Linear protection," Recommendation ITU-T G.873.1, ITU-T Telecommunication Standardization Sector of ITU, Total 40 pages, International Telecommunication Union, Geneva, Switzerland (Oct. 2017).

"Series G: Transmission Systems and Media, Digital Systems and Networks, Digital networks—Optical transport networks, ODUk shared ring protection," Recommendation ITU-T G.873.2, ITU-T Telecommunication Standardization Sector of ITU, Total 108 pages, International Telecommunication Union, Geneva, Switzerland (Aug. 2015).

"Series G: Transmission Systems and Media, Digital Systems and Networks, Digital networks—Optical transport networks, Optical transport network—Shared mesh protection," Recommendation ITU-T G.873.3, ITU-T Telecommunication Standardization Sector of ITU, Total 21 pages, International Telecommunication Union, Geneva, Switzerland (Sep. 2017). Including Erratum 1 (Oct. 2018) to Recommendation ITU-T G.873.3 (2017), Optical transport network—Shared mesh protection.

"Series G: Transmission Systems and Media, Digital Systems and Networks, Data over Transport—Generic aspects—Transport network control aspects, Common control aspects, Amendment 1," Recommendation ITU- It G.7701 (2016)—Amendment 1, ITU-T Telecommunication Standardization Sector of ITU, Total 56 pages, International Telecommunication Union, Geneva, Switzerland (Mar. 2018).

"Series G: Transmission Systems and Media, Digital Systems and Networks, Data over Transport—Generic aspects—Transport network control aspects, Architecture for SDN control of transport networks," Recommendation ITU-T G.7702, ITU-T Telecommunication Standardization Sector of ITU, Total 42 pages, International Telecommunication Union, Geneva, Switzerland (Mar. 2018).

"Series M: TMN and Network Maintenance: International Transmission Systems, Telephone Circuits, Telegraphy, Facsimile and Leased Circuits, Telecommunications management network, Considerations for a telecommunications management network," ITU-T Recommendation M.3013 (Formerly CCITT Recommendation), ITU-T Telecommunication Standardization Sector of ITU, Total 55 pages, International Telecommunication Union, Geneva, Switzerland (Feb. 2000).

"DCN Enhancement," ITU-T Contribution WD08, Total 2 pages (Dec. 2013).

"IEEE Standard for Local and Metropolitan Area Networks—Bridges and Bridged Networks," IEEE Std 802.1Q-2018 Revision of IEEE Std 802.1Q-2014), IEEE Computer Society, Total 1993 pages (May 7, 2018).

McGregor "The PPP Internet Protocol Control Protocol (IPCP)," Network Working Group, Request for Comments: 1332, Total 15 pages (May 1992).

Katz "The PPP OSI Network Layer Control Protocol (OSINLCP)," Network Working Group, Request for Comments: 1377, Total 11 pages (Nov. 1992).

Simpson "The Point-to-Point Protocol (PPP)," Network Working Group, Request for Comments: 1661, Total 57 pages (Jul. 1994).

Rosen et al., "BGP/MPLS IP Virtual Private Networks (VPNs)," Network Working Group, Request for Comments: 4364, Total 50 pages (Feb. 2006).

"Series G: Transmission Systems and Media, Digital Systems and Networks, Digital terminal equipments—General, Series Y: Global Information Infrastructure, Internet Protocol Aspects, Next-Generation Networks, Internet of Things and Smart Cities, Internet protocol aspects—Transport, Interfaces for the optical transport network, Amendment 2," REC ITU-T G.709/Y.1331 (2016)—Amendment 2, ITU-T Telecom Standardization Sector of ITU, Total 245 pages, Geneva, Switzerland (Jun. 2018).

"Series G: Transmission Systems and Media, Digital Systems and Networks, Data over Transport—Generic aspects—Transport network control aspects, Series Y: Global Information Infrastructure, Internet Protocol Aspects and Next-Generation Networks, Internet protocol aspects—Operation, administration and maintenance, Architecture and specification of data communication network," REC ITU-T G.7712/Y.1703, ITU-T Telecom Standardization Sector of ITU, Total 122 pages, Geneva, Switzerland (Sep. 2010).

"Series G: Transmission Systems and Media, Digital Systems and Networks, Packet over Transport aspects—Ethernet over Transport aspects, Series Y: Global Information Infrastructure, Internet Protocol Aspects and Next-Generation Networks, Internet protocol aspects—Transport, Architecture for the automatically switched optical network," Recommendation ITU-T G.8080/Y.1304, ITU-T Telecommunication Standardization Sector of ITU, Total 124 pages, Geneva, Switzerland (Feb. 2012).

"Series M: TMN and Network Maintenance: International Transmission Systems, Telephone Circuits, Telegraphy, Facsimile and Leased Circuits, Telecommunications management network, Principles for a telecommunications management network," ITU-T Recommendation M.3010 (Formerly CCITT Recommendation), ITU-T Telecommunication Standardization Sector of ITU, Total 68 pages, International Telecommunication Union, Geneva, Switzerland (Feb. 2000).

* cited by examiner

NETWORK NODE AND DEVICE FOR DATA COMMUNICATION NETWORKS

CROSS-REFERENCE TO RELATED APPLICATIONS

This application is a continuation of International Patent Application No. PCT/CN2019/079163, filed on Mar. 22, 2019. The disclosure of the aforementioned application is hereby incorporated by reference in its entirety.

TECHNICAL FIELD

Embodiments of the present disclosure relate to the field of Data Communication Network (DCN) technologies. In particular, embodiments of the present disclosure focus on enhancing DCN technologies as currently defined in ITU-T Recommendation G.7712, for instance, in order to support emerging Software Defined Networking (SDN) applications and to enable communication between a centralized SDN controller and distributed Network Elements (NEs) of the DCN. Embodiments of the present disclosure present to this end a network entity for a DCN, a network device for providing DCN traffic to a DCN, and a method performed at a network node of a DCN.

BACKGROUND

DCN technologies are currently used to support distributed NE communications related to e.g., Telecommunications Management Network (TMN) and Automatically Switched Optical Network (ASON) applications. The standard DCN architecture and functions for transport networks (e.g., for Optical Transport Network (OTN) networks) are defined in ITU-T Recommendation G.7712. FIG. 11 (which corresponds to ITU-T FIG. 6-1/G.7712) illustrates example applications, which can be supported via a DCN. Each application can be supported on a separate DCN, or on the same DCN, depending on the network design.

When supporting distributed management communications (e.g., TMN applications), which are described in clause 6.1 of the ITU-T Recommendation G.7712, the DCN provides communication between TMN components defined in the ITU-T Recommendations M.3010 and M.3013 (e.g., NEs, ADs, OSs, MDs, and WSs containing TMN functions such as OSF, TF, NEF, WSF), in order to transport management messages through a management communication network (MCN).

When supporting distributed signalling communications (e.g., ASON applications), which are described in clause 6.2 of the ITU-T Recommendation G.7712, the DCN provides communication between ASON components defined in ITU-T Recommendation G.8080 (e.g., ASON CC and RC components, contained within distributed NEs), in order to transport signalling and routing protocol messages through a signalling communication network (SCN).

ITU-T SG15 is planning to enhance the DCN definitions given in G.7712, in order to support also SDN applications, providing communication between SDN components defined in ITU-T Recommendation G.7702, and, more generally, to support Management-Control Continuum (MCC) applications providing communication between the common control components defined in ITU-T Recommendation G.7701.

In this document, "DCN messages" represent messages that are transported over a DCN, for example, management messages (e.g. in case of TMN applications) and signalling and routing protocol messages (e.g. in case of ASON applications). Further, "DCN components" represent components that are communicating through a DCN, for example, distributed NEs, other TMN components or other ASON components. New types of DCN messages and DCN components may be defined in future extensions of G.7712, for instance, in order to support SDN applications and, more generally, MCC applications. New types of DCN messages could also include support for big data information about the status of the network (e.g., network telemetry).

In clause 6.1 of the ITU-T Recommendation G.7712, the clauses 6.1.1 and 6.1.2 provide some examples of MCN and, respectively, SCN topologies, in which distributed NEs communicate using either Embedded Communication Channels (ECC) or Local Communication Network (LCN), such as Ethernet Local Area Networks (LANs). Notably, in all these MCN topologies, some NEs—called Gateway Network Element (GNE)—are attached to the Operations System (OS). Although not explicitly mentioned in the ITU-T Recommendation G.7712, (two) GNEs can be directly connected with the OS using an Ethernet LAN or, as shown in the ITU-T FIG. 6-4/G.7712, through a Wide Area Network (WAN). In the latter case, typically a WAN gateway router is connected to the GNE using an Ethernet LAN. Typically, dual gateways are used to support reliable communication.

In clause 6.2 of ITU-T Recommendation G.7712, some topologies are provided, in which there are no GNEs, because current ASON applications require communication only between distributed NEs. However, this assumption may change in future extensions of G.7712, for example, in order to support centralized ASON components, such as a Path Computation Engine (PCE).

It can be assumed that GNEs are used as gateway nodes toward centralized components, for example, the OS (TMN applications) or a centralized SDN controller (for SDN applications). In all cases, the DCN provides layer-3 connectivity between all the DCN components, including distributed NEs that need to exchange DCN messages such as the management messages (for TMN applications) or the signalling and routing protocol messages (for ASON applications). The layer-3 protocols supported by the ITU-T Recommendation G.7712 Edition 4.0 are Internet Protocol (IP) and Open System Interconnection (OSI). The following layer-3 requirements are defined for the distributed NEs to support DCN capabilities:

Each NE must be capable of performing the function of an OSI end-system or IP host (i.e., terminating DCN messages addressed to that NE).

NEs may also be capable to perform the function of an OSI intermediate-system or IP router (i.e., forwarding DCN messages addressed to other NEs or other DCN components).

It is worth noting that ITU-T FIG. 6-2/G.7712 Edition 4.0 describes also the option for an NE to be a layer-2 switching system for DCN messages, which are addressed to other NEs or to other DCN components. However, no further requirements are defined in the other clauses of the ITU-T Recommendation G.7712 Edition 4.0. The ITU-T Recommendation G.7712 Edition 4.0 specifies the layer-1, layer-2 and layer-3 functions for the following interfaces to be used to forward DCN messages:

Embedded Communication Channels (ECC) between remote NEs.

Ethernet LAN between local (co-located) NEs or any other component/DCN entities.

The possibility to use external WAN links, e.g. for ASON applications, is also mentioned, but not described in detail within the ITU-T Recommendation G.7712 Edition 4.0.

The layer-1 ECC functions are defined in clause 7.1.1 of G.7712 Edition 4.0. For Optical Transport Network (OTN) interfaces, the General Communication Channels (GCC) defined in ITU-T Recommendation G.709 Edition 5.3 (GCC0, GCC1 and GCC2) are used to provide a communication channel to transport a bit-stream between two OTN NEs. The layer-2 ECC functions are defined in clause 7.1.2 of G.7712 Edition 4.0. For OTN interfaces, HDLC frame signal is mapped in a bit-synchronous manner into the GCC channel. The layer-3 ECC functions are defined in clause 7.1.3 of G.7712 Edition 4.0. IP and/or OSI packets are mapped into HDLC frames using "PPP in HDLC-like framing", as defined in IETF RFC 1662, RFC 1661, RFC 1332 and RFC 1377.

The layer-1 and layer-2 Ethernet LAN functions are defined in clause 7.1.4 of G.7712 Edition. 4.0 Even if not explicitly stated, it is assumed that these functions are defined in IEEE 802.3 specification. The layer-3 Ethernet LAN functions are defined in clause 7.1.5 of G.7712 Edition 4.0. IP and/or OSI packets are mapped into Ethernet MAC frames, as defined in ITU-T Q.811, IETF RFC 826 and RFC 826.

Other layer-3 functions, such as those required to implement the OSI intermediate-system or IP router capabilities, are also defined in the ITU-T Recommendation G.7712 Edition 4.0.

FIG. 12 shows an exemplary DCN, in particular based on OTN NE implementation, in which multiple NEs are provided and a controller (e.g. SDN controller) is further provided to provide, for instance exchange, traffic over the DCN. As is shown in FIG. 12, DCN functions of a NE are implemented in software within a dedicated Control Card (CC), in which DCN messages addressed to that NE are terminated, while other DCN messages (not addressed to that NE) are forwarded. It is also worth noting that the Ethernet LAN interfaces of a GNE are usually low-rate Ethernet interfaces (up to 100 Mbit/s, as reported in clause 7.1.4/G.7712) attached to the Control Card (CC) dedicated to carry DCN traffic.

The implementation shown in FIG. 12 has some drawbacks, which need to be resolved to support emerging DCN applications such as the SDN applications:

Low Throughput: limited by the OTN Embedded Control Channel (ECC) bandwidth.

High Latency: caused by software-based packet forwarding implementation within a Control Card.

FIG. 13 shows an exemplary DCN, in particular an approach to increase the DCN throughput and to reduce the DCN latency. The approach has been proposed to ITU-T Q12&Q14/15 interim meeting in December 2013 by ITU-T contribution WD08. The main idea of this ITU-T contribution WD08 is to setup a set of Optical Data Unit-k (ODUk), e.g., ODU0, connections between the SDN controller and each OTN NE to be controlled. Each OTN NE then terminates the ODUk connection carrying DCN messages addressed to itself, and forwards all other ODUk connections carrying DCN messages addressed to other NEs or other DCN components. This approach provides:

Higher Throughput: since using multi-Gbps ODU0/ODUflex bandwidth.

Lower Latency: since hardware-based ODUk forwarding is implemented within the OTN matrix.

It also improves DCN reliability, since ODUk protection mechanisms, as those defined in ITU-T Recommendations G.873.1, G.873.2 and G.873.3, can also be used to protect the ODUk connections carrying DCN traffic.

However, while addressing some technical issues of existing DCN technologies (e.g. as shown in FIG. 12), the approach shown in FIG. 13 has also some drawbacks:

DCN bandwidth efficiency is low: since at least 1 Gbps (ODU0) bandwidth should be allocated for any NE, including those NEs that need less DCN bandwidth.

A high number of IP interfaces needs to be managed (i.e. one for each NE) on the SDN controller.

The SDN Controller needs to support OTN interfaces instead of Ethernet LAN interfaces.

The DCN bandwidth efficiency issue could be resolved by setting up sub-1G OTN connections re-using the sub-1G OTN frame structures which are currently under definition by ITU-T G.Sup_sub1G work item. However, this approach would require that each OTN NE within the network is capable of switching these sub-1G OTN frames.

SUMMARY

In view of the above-mentioned disadvantages, embodiments of the present invention aim to improve the current DCN implementations and approaches. An objective is to enhance DCN technologies, in order to provide higher throughput and lower latency, in particular, for the use of SDN applications. Also a high DCN reliability is desired. Thereby, a high bandwidth efficiency should be maintained, and the number of interfaces to be managed on a controller should be low.

The objective is achieved by the embodiments of the invention described in the enclosed independent claims. Advantageous implementations of the present invention are further defined in the dependent claims.

In particular, the embodiments of the invention focus on exploiting multi-service Optical Transport Network (MS-OTN) NE capabilities, in order to enhance the DCN to provide higher throughput and lower latency for SDN applications.

A main idea for the embodiments of the invention is to carry DCN messages over TDM connections (e.g. over ODUk connections), and to switch packets carrying the DCN messages within network nodes (e.g. MS-OTN NE) of the DCN, for instance, by using a packet matrix. To this end, a packet-based VPN (called DCN VPN) may be configured within the network node and may be used to carry DCN messages, requiring high-throughput/low-latency forwarding, over the TDM connections. Within the network node, DCN messages addressed to that network node may be terminated. All the other DCN messages may be forwarded by the network node, e.g. using the matrix in the packet layer (hardware-based forwarding) toward other TDM (e.g. ODUk) connections or Ethernet LAN interfaces. DCN messages can also be carried over the Ethernet LAN interfaces on line cards. These interfaces can be used to connect network nodes functioning as GNE with e.g. the SDN controller (or some WAN gateway router).

A first aspect of the invention provides a network node for a DCN, wherein the network node is configured to: receive a plurality of packets carrying DCN messages, determine, from the received packets, a first set of packets addressed to other network nodes of the DCN, and forward the first set of packets over a TDM connection to a determined network node of the DCN.

The network node of the first aspect may be any type of NE in the DCN, e.g. also a GNE. A DCN message is, as already defined above, any message that is exchanged on/over the DCN. The determined network node may not necessarily be the destination/target node to which the DCN message is addressed. The determined network node may still decide to forward again the packet to a further node in the DCN.

Packets, which are addressed to different network nodes are forwarded in particular over the same TDM connection. Thus, a controller does not have to maintain a large number of IP interfaces but can send all the DCN messages addressed to different network nodes over a single Ethernet LAN interface to a GNE. This reduces the complexity of the system. Further, the network node of the first aspect supports enhancing DCN technologies, in order to provide higher throughput and lower latency forwarding, in particular, for SDN applications. Higher throughput is enabled, because high bandwidth TDM connections (e.g. multi-Gbps ODU0/ODUflex) are used. Lower latency is enabled, because hardware-based packet forwarding can implemented within e.g. the MS-OTN matrix. Further, DCN reliability is improved, since packet and/or ODUk protection mechanisms can be used to protect the DCN traffic carried by the ODUk connections with short traffic interruption (e.g., 50 ms switching time).

In an implementation form of the first aspect, the network node is further configured to: determine, from the received packets, a second set of packets addressed to an external network controller, and forward the second set of packets over an Ethernet connection to the external network controller or other external network device.

The external network controller may be a SDN controller. The second set of packets can be forwarded to other DCN nodes over TDM connections, before being transmitted to the external controller over Ethernet. However, the second set of packets can also be forwarded directly to the network controller, i.e. the network node of the first aspect may function as GNE.

In an implementation form of the first aspect, the network node is further configured to: receive packets over a TDM connection from another determined network node of the DCN.

In an implementation form of the first aspect, the network node is further configured to: receive packets over an Ethernet connection, in particular from an external network controller or other external network device.

That is, the network node may function as GNE.

In an implementation form of the first aspect, a TDM connection is an ODUk connection.

This connection can provide particularly high bandwidth, and thus throughput.

In an implementation form of the first aspect, the network node is further configured to: determine and forward a set of packets using a packet matrix.

The packet matrix can particularly be used to forward the above-described first set of packets and/or second set of packets. The packet matrix is a hardware implementation providing the switching of the packets, carrying DCN messages, based on information provided in the packet overhead (e.g., their addressing). The hardware-based switching can be fast, in particular compared to software-based switching, such that low latency can be achieved.

In an implementation form of the first aspect, the network node is further configured to: determine and forward a set of packets based on a packet-based VPN.

In an implementation form of the first aspect, the packet-based VPN includes a flow-based VPN, in particular a layer-2 VPN or a layer-3 VPN. The packet based VPN provides an efficient implementation with low latency.

In an implementation form of the first aspect, the network node is further configured to: separate a set of packets into first packets carrying DCN messages requiring high throughput and/or low latency forwarding, and second packets carrying other DCN messages, and forward only the first packets over the TDM connection or Ethernet connection.

Thus, the throughput and latency of particularly the relevant DCN messages can be improved.

In an implementation form of the first aspect, the network node is further configured to: separate the set of packets based on at least one of: separated layer-3 network instances, a separated IP address space within a shared layer-3 network instance, one or more packet classification rules.

A second aspect of the invention provides a DCN network comprising a plurality of network nodes, wherein at least one of the network nodes is a network node according to the first aspect or any of its implementation forms.

The DCN network of the second aspect achieves higher throughput and lower latency, in particular, for SDN applications, due to the use of the network node(s) of the first aspect.

A third aspect of the invention provides a network device for providing DCN traffic to a DCN, wherein the network device is configured to: separate packets carrying DCN messages into first packets carrying DCN messages requiring high throughput and/or low latency forwarding, and second packets carrying other DCN messages, provide the first packets over a higher-speed connection, in particular over an Ethernet connection, to a determined network node of the DCN, and provide the second packets over a lower-speed connection, in particular over an Ethernet connection, to the same determined network node of the DCN.

The network device of the third aspect supports enhancing DCN technologies to provide higher throughput and lower latency, in particular, for SDN applications. In particular, due to the separation of the packets and the respective use of the higher/lower speed Ethernet connections, the throughput can be increased. The network device of the third aspect may be a network controller, e.g. SDN controller, controlling the network nodes of the DCN.

In an implementation form of the third aspect, the network device is configured to: separate the packets based on at least one of: separated layer-3 network instances, a separated IP address space within a shared layer-3 network instance, and one or more packet classification rules.

In an implementation form of the third aspect, the network device is a network controller, in particular a SDN controller, or is a router.

A fourth aspect of the invention provides a method performed at a network node of a DCN, wherein the method comprises: receiving a plurality of packets carrying DCN messages, determining, from the received packets, a first set of packets addressed to other network nodes of the DCN, and forwarding the first set of packets over a Time-Division-Multiplexing, TDM, connection to a determined network node of the DCN.

The method can be implemented according to implementation forms described for the first aspect. The method accordingly achieves all advantages and effects of the network node of the first aspect and its implementation forms.

A fifth aspect of the invention provides a computer program product comprising a program code for controlling a network node according to the first aspect or any of its implementation forms, or for carrying out, when implemented on a processor, the method according to the fourth aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which.

DESCRIPTION OF EMBODIMENTS

Figure 1:
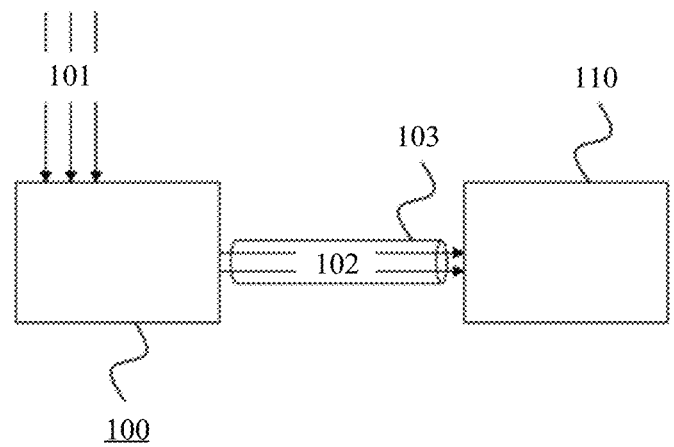
FIG. 1 shows a network node according to an embodiment of the invention.

FIG. 1 shows a network node 100 according to an embodiment of the invention. The network node 100 is configured for a DCN network. The network node 100 may be a NE or a GNE in the DCN network.

The network node 100 is configured to receive a plurality of packets 101 carrying DCN messages, i.e. each packet 101 carries one DCN message. The packets/DCN messages may be addressed to the network node 100 or to another network node or component in the DCN. The packets 101 may be received from another network node or from an external network device (like the one shown in FIG. 2), e.g. a network device/controller 200.

Further, the network node 100 is configured to determine, from the received packets 101, a first set 102 of packets 101, which are addressed to other network nodes of the DCN (or other components), i.e. are not addressed to the network node 100. Further, the network node 100 is configured to forward, e.g. using a packet matrix or other hardware-based packet switching mechanism, the first set 102 of packets 101 over a TDM connection 103, e.g. over an ODUk connection, to a determined (other) network node 110 of the DCN. The determined network node 110 may be a network node to which packets 101 of the first set 102 of packets 101 are addressed, but may also be simply a predetermined "next" network node in a chain of network nodes. The determined network node 110 may be another network node 100 according to an embodiment of the invention, but can also be a network node 110 not according to an embodiment of the invention. For instance, with respect to FIG. 6 it will be explained that a network node 100 may be a MS-OTN NE, and a network node 110 may be an OTN NE.

Figure 2:
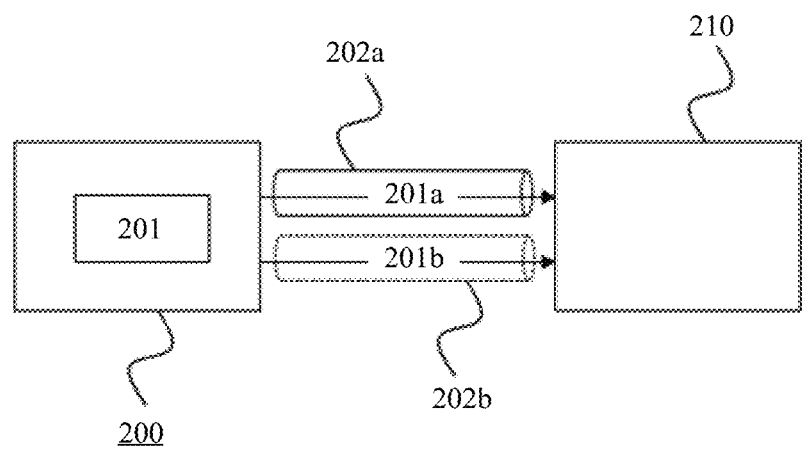
FIG. 2 shows a network device according to an embodiment of the invention.

FIG. 2 shows a network device 200 according to an embodiment of the invention. The network device 200 is configured to provide, for instance exchange, DCN traffic over a DCN, e.g. the DCN including the network node 100. The network device 200 may be an external network controller, like an SDN controller.

The network device 200 is configured to separate packets 201 carrying DCN messages into first packets 201a carrying DCN messages requiring high throughput and/or low latency forwarding, and second packets 201b carrying other DCN messages (e.g. allowing lower throughput and/or higher latency forwarding). Further, the network device 200 is configured to provide the first packets 201a over a higher-speed connection 202a, in particular over an Ethernet connection, to a determined network node 210 of the DCN, and to provide the second packets 201b over a lower-speed connection 202b, in particular over an Ethernet connection, to the determined network node 210 of the DCN. Optionally the second packets 201b can also be sent over the higher-speed connection 202a.

The determined network node 210 of the DCN, to which the network device 200 provides the packets 201, may be implemented according to the network node 100 shown in FIG. 1. That is, the network node 100 may be a GNE that receives packets 201 (e.g. the packets 101 described with respect to FIG. 1) from the network device 200.

Figure 3:
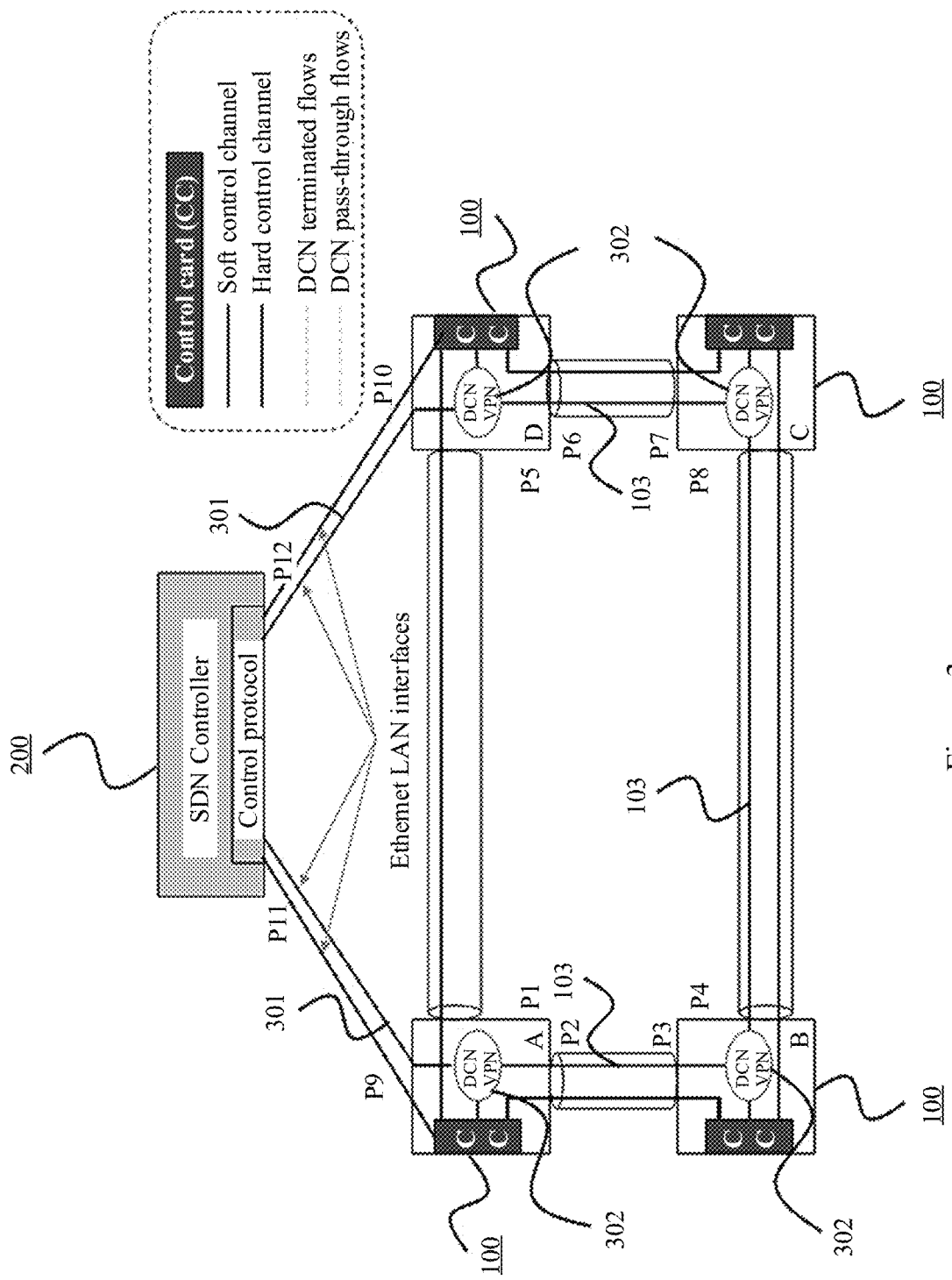
FIG. 3 shows a DCN network including network nodes and a network a device according to embodiments of the invention.

FIG. 3 shows a DCN network according to an embodiment of the invention, which includes network nodes 100 that build on the network node 100 shown in FIG. 1, and includes a network device 200 that builds on the network device 200 shown in FIG. 2.

It can be seen in FIG. 3, that each network node 100 according to an embodiment of the invention (also referred to as MS-OTN NE in this implementation) may be provided with a DCN VPN 302. In particular, this DCN VPN 302 may be configured within the MS-OTN data plane network, and may be used to carry DCN messages, requiring high-throughput/low-latency forwarding, over high-bandwidth TDM, specifically ODUk, connections 103. Within each network node 100, packets/DCN messages addressed to that network node 100 may be terminated (forwarded to a CC card and then terminated). All other packets/DCN messages may be forwarded, e.g. by a matrix in the packet layer (i.e. generally by a hardware-based forwarding), e.g. toward another ODUk connection 103 (e.g. to another network node) or an Ethernet LAN interface 301 (e.g. to the SDN controller 200). The packets/DCN messages can also be carried over the Ethernet LAN interface 301 on one or more line cards. These interfaces can particularly be used to connect network nodes 100 being GNEs with e.g. the SDN controller 200 (or with a WAN gateway router).

For example, with reference to FIG. 3, the GNE A (a network node 100 as shown in FIG. 1) receives from the SDN controller 200 (the network device 200 shown in FIG. 2) through a high-speed local Ethernet interface 301 (i.e. a hard control channel), packets/DCN traffic (i.e. e.g. the plurality of packets 101 of FIG. 1, and/or the packets 201 of FIG. 2), which are addressed either to itself and/or to NEs B, C and D (i.e. to further network nodes 100 as shown in FIG. 1). GNE A may process the packets/DCN messages addressed to itself (second set of packets 101), and may forward all other packets/DNC messages (first set 102 of packets 101) to NE B using the ODUk connection 103 setup between NE A and NE B. Then, NE B may process the packets/DCN messages addressed to itself, and may forward all other packets/DCN messages to NE C using the ODUk connection 103 setup between NE B and NE C.

The DCN shown in FIG. 3 achieves the following advantages:

High throughput, because high-bandwidth TDM connections 103 (e.g. multi-Gbps ODU0/ODUflex bandwidth) are used.

Low Latency, because hardware-based packet forwarding is implemented within the MS-OTN matrix.

Improved DCN reliability, since packet and/or ODUk protection mechanisms can also be used to protect the DCN traffic with short traffic interruption (e.g., 50 ms switching time).

Figure 13:
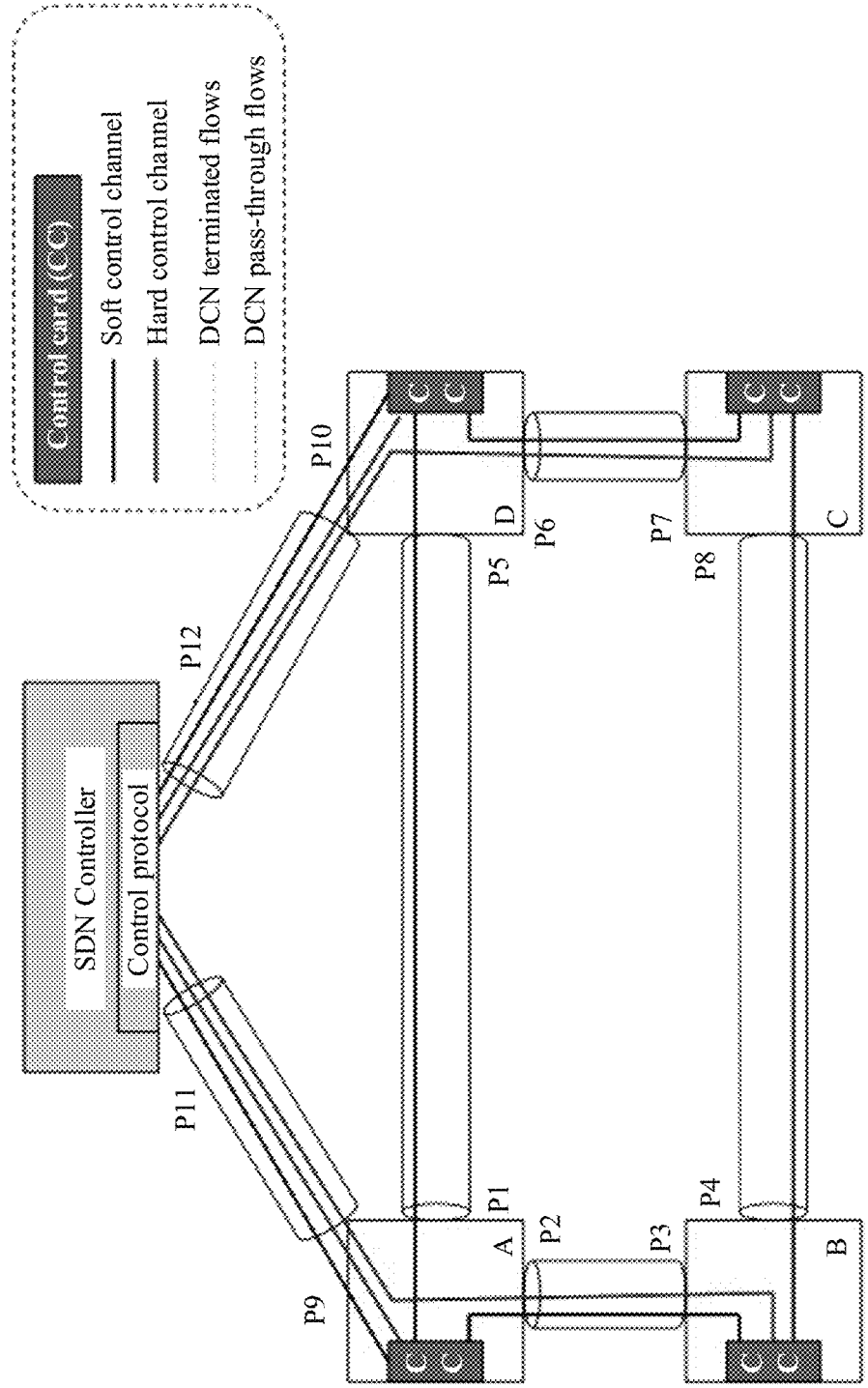
FIG. 13 shows an exemplary DCN network.

In addition, the DCN shown in FIG. 3 also provides the following advantages, which resolve the issues of the approach proposed in the ITU-T contribution WD08 (see FIG. 13):

Higher bandwidth efficiency, since the packets/DCN messages addressed to different NEs (network nodes) can be mapped over the same TDM/ODUk connection 103. The DCN bandwidth for each node/NE can be allocated in a packet-based format without being constrained by the TDM/ODU bandwidth hierarchy/granularity.

The number of (IP) interfaces to be managed within the DCN and on the SDN controller 200 is limited.

High-speed Ethernet LAN interfaces, typically attached to the MS-OTN line cards, can be used to connect the MS-OTN to the SDN controller 200 (or a WAN gateway router).

Multi-layer DCN optimization is possible, since DCN by-pass traffic can be forwarded/protected at either TDM/ODUk or packet layer.

Notably, with respect to the above, the OTN technology is generally a switching technology, which encompasses both the photonic and the electrical domain. Within the electrical domain (TDM switching) it provides high-bandwidth (multi-Gbps) connectivity between any pair of remote access points connected to the OTN network.

Figure 4:
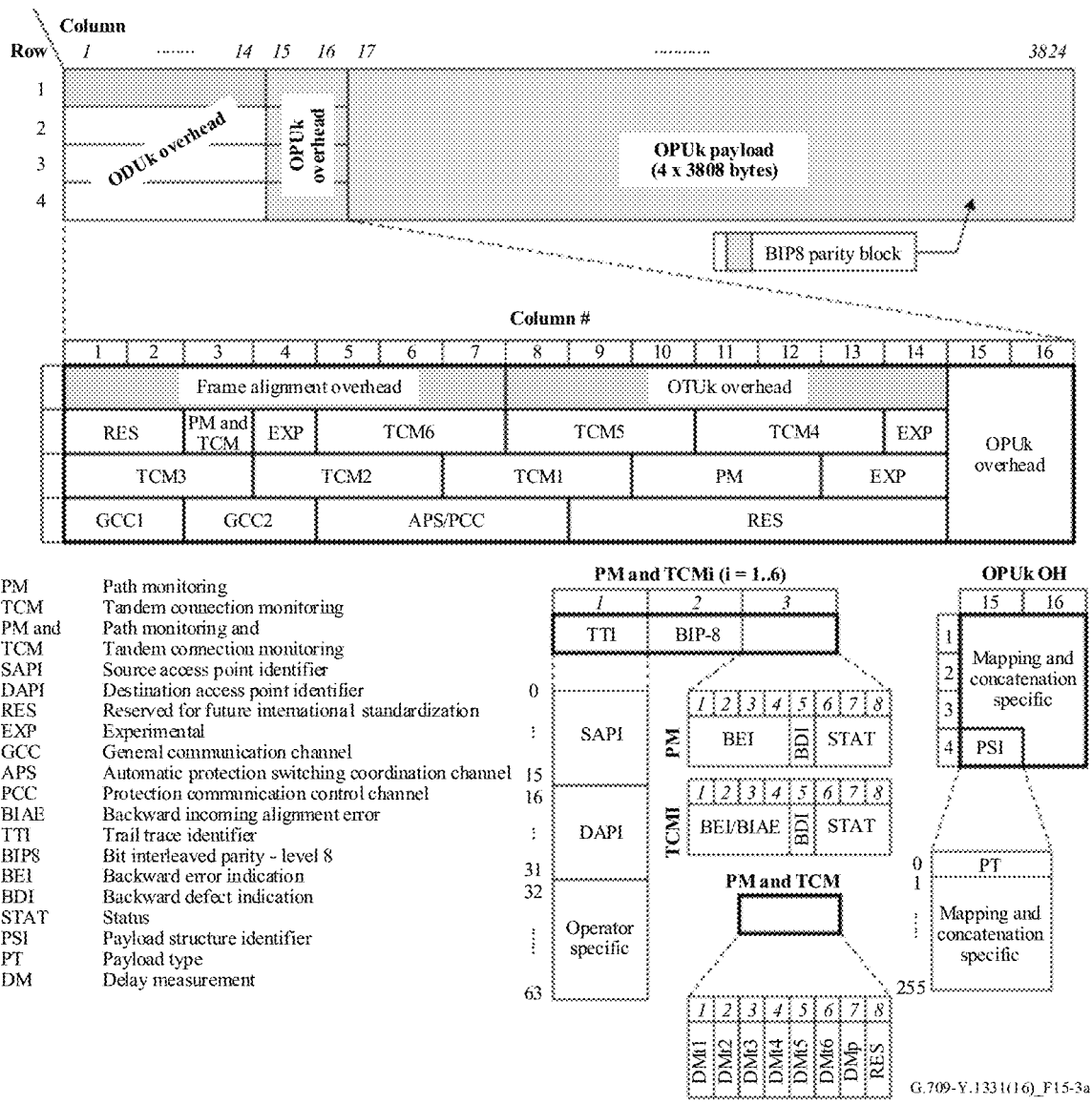
FIG. 4 shows an ODUk frame structure, ODUk and OPUk overhead, containing the GCC1 and GCC2 overhead bytes.

OTN switching may be performed by switching ODUk frames. An ODUk frame contains a payload, Optical Payload Unit (OPUk), and an overhead, as shown in FIG. 4 (which corresponds to ITU-T FIG. 15-5/G.709 Edition 5.3). An ODUk connection is setup between the two remote access points connected to the OTN network. The user traffic received from the remote access points is carried by the OPUk, and transparently carried by the intermediate OTN NEs, which switches the ODUk frame. The ODUk overhead contains two General Communication Channel (GCC) overhead bytes, called GCC1 and GCC2, which are used to carry DCN messages between the two nodes terminating the ODUk connection. One or more ODUk frames can be mapped over an Optical Transport Unit-k (OTUk) for transmission over an OTN interface between two adjacent OTN nodes. The OTUk frame contains an overhead, a payload and a Forward Error Correction (FEC), as shown in FIG. 4.

The OTUk overhead contains one General Communication Channel (GCC) overhead byte, called GCC0, which is used to carry DCN messages between the two adjacent OTN NEs.

Figure 5:
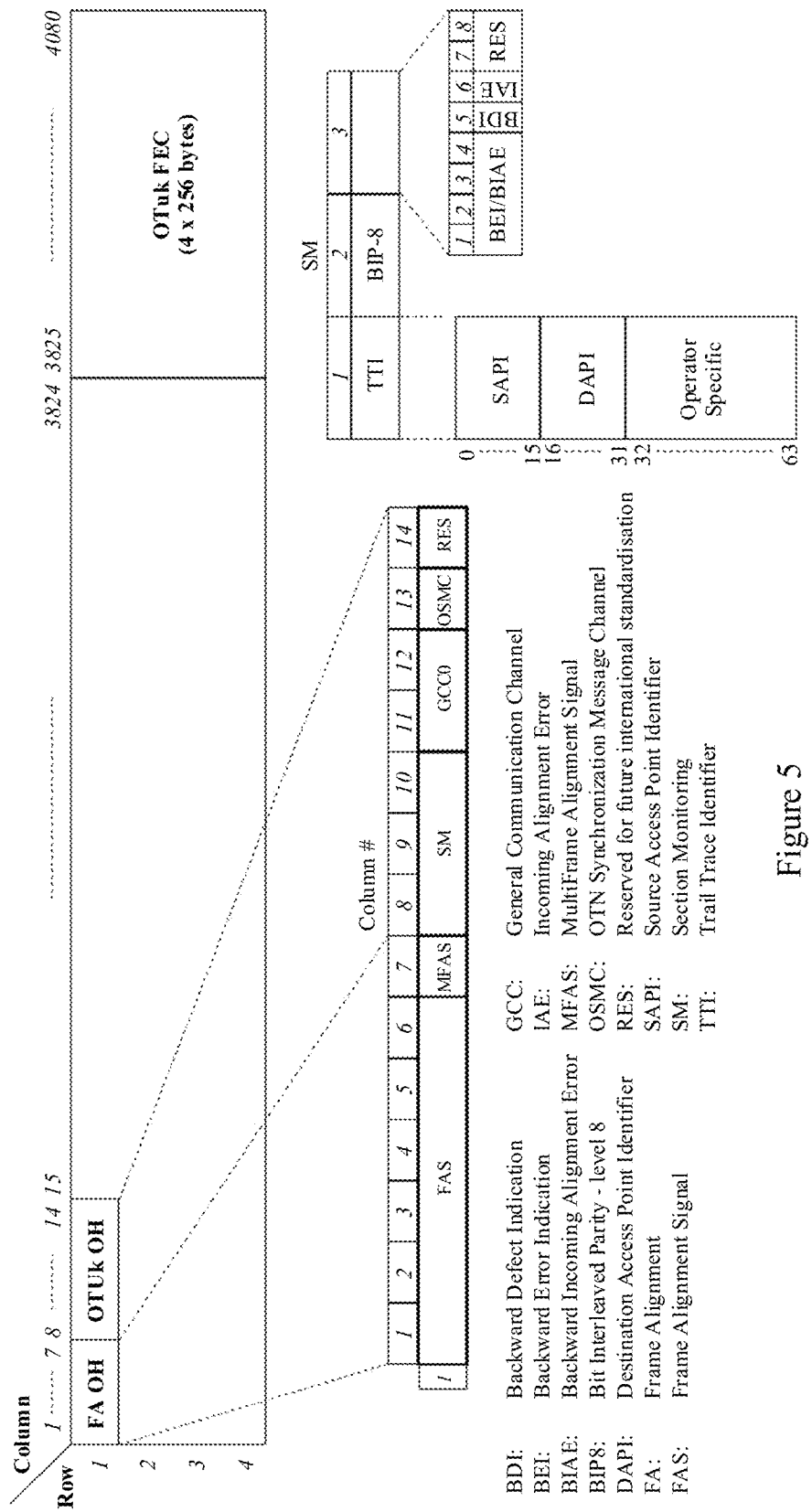
FIG. 5 shows an OTUk frame structure, frame alignment and OTUk overhead, containing the GCC0 overhead bytes.

ITU-T Recommendation G.709 has been recently updated to define also ODUCn and OTUCn frames to support OTN rate of 100 Gbps and beyond. These frames also support GCC0 (OTUCn) and GCC1/GCC2 (ODUCn). FIG. 5 (which corresponds to ITU-T FIG. 15-3/G.709 Edition 5.3) shows an OTUk frame structure, frame alignment and OTUk overhead, containing the GCC0 overhead bytes.

ITU-T has recently started a new G.Sup_sub1G work item to describe mechanisms to channelize the payload of an existing ODUk/flex to carry sub-1G TDM connections. The main application scenario is to carry multiple sub-1G TDM services over one ODUk/flex with high bandwidth efficiency. These mechanisms would include SDH and packet-based circuit emulation over OTN as well as sub-1G OTN frame structures. These standard sub-1G OTN frame structures are currently not intended to be defined as a switching layer but only to be used to map and multiplex multiple sub-1G TDM connections within existing ODUk connections. However, it is expected that some proprietary extensions will be implemented to allow switching sub-1G OTN connections within the network to further improve the bandwidth efficiency.

The term "multi-service OTN" (MS-OTN) is used to represent an OTN NE which, in addition to support line cards with OTN interfaces and matrix cards being capable to switch at the ODUk layer (TDM switching), can also support line cards with other interfaces, in particular Ethernet LAN interfaces and matrix cards being capable to switch packets/frames (packet switching). Both TDM and packet switching are implemented in hardware within the central matrix. Packets received from Ethernet LAN interfaces can be switched at the packet layer toward other Ethernet LAN interfaces or toward OTN interfaces. In the latter case, these packets are mapped into an ODUk for transmission over OTN interfaces. Alternatively, packets received from Ethernet LAN interfaces can be mapped into an ODUk and switched at the ODUk layer toward OTN interfaces. It is worth noting that the Ethernet LAN interfaces attached to MS-OTN line cards are usually high-speed Ethernet interfaces (from 1 Gbit/s up to hundreds of Gbit/s) intended to carry user traffic.

In the embodiments of the invention (e.g. shown in FIG. 1-3), DCN messages that require high throughput and/or low latency forwarding, e.g., to support SDN applications, can be carried over either:

High-speed Ethernet LAN interfaces 301, typically attached to MS-OTN line cards.

TDM (e.g. OTN ODUk) connections 103.

The network nodes 100 can forward packets/DCN traffic between these interfaces using e.g. the packet matrix (hardware-based forwarding):

DCN messages addressed to the network node 100 may be forwarded to the Control Card (CC) and terminated.

All the other packets 101/DCN messages may be forwarded by e.g. the matrix in the packet layer (hardware-based forwarding) toward other TDM/ODUk connections 103 or high-speed Ethernet LAN interfaces 301 (typically attached to an MS-OTN line card).

The packet-based VPN (DCN VPN) 302 may be configured within the MS-OTN data plane network to carry the packets/DCN messages, requiring high-throughput/low-latency forwarding, over these new types of DCN channels (in particular, over ODUk connections 103). One or more DCN VPN 302 instances can be configured within the MS-OTN data plane network depending on the DCN architecture and isolation requirements.

Transmission of DCN traffic over OTN ODUk connections is not supported by the ITU-T Recommendation G.7712. Extensions are thus needed to G.7712 to support these new type of interfaces.

An implementation supporting only the current standard solution in G.7712 will not be capable to carry DCN traffic over ODUk connections. Since the DCN messages carried within the same ODUk connection are switched in the packet layer, the ODUk connections 103 can be setup between any pair of remote network nodes 100 (e.g., NEs A and B in FIG. 3), and used to carry packets/DCN messages addressed to different network nodes (e.g., the ODUk connection 103 between NEs A and B in FIG. 3 can carry DCN traffic addressed to NE B, C and D).

Different types of packet-based VPN could be configured, depending on the MS-OTN network capabilities and/or operator's preference, to carry the DCN traffic requiring high-throughput and/or low latency forwarding.

One possibility is to configure a L2VPN instance within the MS-OTN, in order to carry the packets/DCN traffic. In this case the SDN controller 200 (or the WAN gateway router, if present) and all the network nodes 100 control cards reachable through the same GNEs belong to the same layer-3 subnetwork and use standard layer-3 mechanisms to exchange layer-3 packets (e.g., IP packets or OSI CLNP packets) over the same Ethernet LAN.

Network nodes 100 forward the DCN messages using layer-2 switching (as shown e.g. in ITU-T FIG. 6-2/G.7712) based on the MAC Destination Address (MAC DA) field of the Ethernet frames. For example, with reference to FIG. 3, the GNE A receives Ethernet frames carrying DCN messages from the SDN controller 200 and it would process (within the control card) those with the MAC DA matching its control card MAC address and forward to the NE B, through the ODUk connection 103, all the other Ethernet frames.

There are multiple way to implement L2VPN over MS-OTN networks, such as using Ethernet Bridging (IEEE 802.1Q) or MPLS-TP L2VPN. Any option can be used depending on the MS-OTN network capabilities and/or operator's preference. When using the Ethernet Bridging (IEEE 802.1Q) solution, an S-VLAN may be allocated to carry the DCN traffic of one DCN VPN instance. The high-speed local Ethernet interfaces as well as the ODUk connections 103 setup for packets/DCN traffic may be registered as ports belonging to this S-VLAN to ensure DCN VPN traffic separation. Standard IEEE 802.1Q MAC address learning and forwarding procedures may be used to forward the Ethernet frames carrying packets/DCN messages among these ports. The S-VLAN tag can be or not carried by forwarded Ethernet frames depending on standard 802.1Q Port VLAN ID (PVID) and untagged set configuration.

For example, with a reference to FIG. 3, the GNE A receives untagged Ethernet frames carrying DCN messages from the high-speed local Ethernet interfaces. It may associate these frames to the S-VLAN assigned to the DCN VPN (based on the PVID configuration), may learn that the MAC SA is reachable through that interface, and may forwards the frames based on their MAC DA. Frames with the MAC DA equal to the GNE A control card MAC address may be passed to the control card (CC) for local processing. All the other frames may be transmitted to the ODUk connection 103 setup between NE A and NE B either because the MAC DA has been learnt as reachable through that port or as part of the standard 802.1Q flooding process for frames with unknown MAC DA. If the ODUk connection 103 is configured to be part of the untagged set for the S-VLAN, the forwarded Ethernet frames are transmitted as untagged frames, otherwise they are transmitted with the S-VLAN tag.

NE B then receives either untagged or S-VLAN tagged Ethernet frames carrying DCN messages from that ODUk connection. In the former case (untagged Ethernet frames), it may associate these frames to the S-VLAN assigned to the DCN VPN (based on the PVID configuration), while in the latter case (S-VLAN tagged Ethernet frames), it may just check that the VLAN ID (VID) carried in the S-VLAN tag matches the S-VLAN assigned to the DCN VPN. In both cases, it may learn that the MAC SA is reachable through that ODUk connection 103 and may forward the frames based on their MAC DA. Frames with the MAC DA equal to the NE B control card MAC address may be passed to the control card (CC) for local processing. All the other frames may be transmitted to the ODUk connection 103 setup between NE B and NE C either because the MAC DA has been learnt as reachable through that port or as part of the standard 802.1Q flooding process for frames with unknown MAC DA.

When using the MPLS-TP L2VPN solution, a Virtual Switch Instance (VSI), as defined in RFC 4664, may be created in each MS-OTN NE for the DCN VPN instance, and a full mesh of PWs may be setup to connect these VSIs. For example, with reference to FIG. 3, the GNE A receives untagged Ethernet frames carrying DCN messages from the high-speed local Ethernet interfaces. It may associate these frames to the VSI assigned to the DCN VPN, may learn that the MAC SA is reachable through that interface and may forward the frames based on their MAC DA:

Frames with the MAC DA equal to the GNE A control card MAC address will be passed to the control card (CC) for local processing.

Frames with the MAC DA equal to the NE B control MAC address, if known/learnt, will be sent to the PW setup between the VSIs in GNE A and NE B (over an MPLS-TP LSP setup between GNE A and NE B).

Frames with the MAC DA equal to the NE C control MAC address, if known/learnt, will be sent to the PW setup between the VSIs in GNE A and NE C (over an MPLS-TP LSP setup between GNE A and NE C).

Frames with the MAC DA equal to the NE D control MAC address, if known/learnt, will be sent to the PW setup between the VSIs in GNE A and NE D (over an MPLS-TP LSP setup between GNE A and NE D).

All the other frames, with unknown MAC DA, will be flooded to all these PWs.

The MPLS-TP packets of the LSPs setup between GNE A and NEs B, C and D may then be forwarded to NE B using the ODUk connection 103 setup between GNE A and NE B. NE B then receives MPLS-TP packets for all these LSPs and takes forwarding decision based on the LSP label at the top of the label stack:

If the label at the top of the stack identifies either the LSP setup between GNE A and NE C or the LSP setup between the GNE A and NE D, the MPLS-TP packets are forwarded to NE C using the ODUk connection setup between NE B and NE C (the MPLS-TP LSP label is swapped following standard MPLS forwarding procedures)

If the label at the top of the stack identifies the LSP setup between the GNE A and NE B, the second label (i.e., the PW label) is used to identify to which VSI the Ethernet frames carried within the MPLS-TP packet should be associated: in this case, it will be the VSI assigned to the DCN VPN. NE B then learns that the MAC SA is reachable through the PW setup between the VSIs in GNE A and NE B and forwards the Ethernet frame based on the MAC DA:

Frames with the MAC DA equal to the NE B control card MAC address will be passed to the control card (CC) for local processing.

All the other frames will be dropped because of the split-horizon rule associated with the PWs (RFC 4664).

Another possibility is to configure a L3VPN instance within the MS-OTN to carry the packets/DCN traffic. In this case the SDN controller 200 and all the network nodes 100 (MS-OTN NE) control cards reachable through the same GNEs belong to the same layer-3 network (e.g., IP or OSI CLNP) and use standard layer-3 IP forwarding mechanisms to exchange layer-3 packets. MS-OTN NEs forward the DCN messages using layer-3 switching, as shown in ITU-T FIG. 6-2/G.7712, based on the layer-3 Destination Address (e.g., the IP DA) field of the layer-3 packets (e.g. the IP packets).

For example, with reference to FIG. 3, GNE A receives IP packets carrying DCN traffic from the SDN controller 200 and it may process (within the control card) those with the IP DA matching its control card IP address and forward to NE B, through the ODUk connection 103, all the other IP packets.

There are multiple ways to implement L3VPN over MS-OTN networks. Any option can be used depending on the MS-OTN network capabilities and/or operator's preference. One option is similar to the Ethernet Bridging (IEEE 802.1Q) solution described above where each MS-OTN NE performs L3 forwarding instead of L2 bridging. Standard IP forwarding procedures are used to forward the IP packets carrying DCN messages among these IP interfaces. The VLAN tag (either a C-VLAN or an S-VLAN) can be or not used on the high-speed local Ethernet interfaces as well as the ODUk connections setup for DCN traffic depending on whether the IP interfaces are or not channelized.

For example, with reference to FIG. 3, the GNE A receives untagged Ethernet frames encapsulating IP packets carrying DCN messages from the high-speed local Ethernet interfaces. It may terminate these Ethernet frames and may associate the encapsulated IP packets to the DCN VPN and may forward the packets based on their IP DA. Packets with the IP DA equal to the GNE A control card IP address will be passed to the control card (CC) for local processing. All the other packets are transmitted to the ODUk connection 103 setup between NE A and NE B, either because the IP DA is known (either from dynamic routing information or by static routing configuration) to be reachable through that port or because of default routing configuration. If the ODUk connection 103 is configured as a channelized IP interface, the forwarding IP packets are encapsulated into VLAN tagged Ethernet frames, otherwise they are encapsulated into untagged Ethernet frames.

NE B then receives either untagged or VLAN tagged Ethernet frames encapsulating IP packets carrying DCN messages from that ODUk connection. It may terminate these Ethernet frames and may associate the encapsulated IP packets to the DCN VPN either based on the ODUk connection (in case of untagged Ethernet frames) or based on the VLAN ID (VID) carried in the VLAN tag (in case of VLAN tagged Ethernet frames). In both cases, it may forward the packets based on their IP DA. Packets with the IP DA equal to the NE B control card IP address may be passed to the control card (CC) for local processing. All the other packets are transmitted to the ODUk connection 103 setup between NE B and NE C either because the IP DA is known (either from dynamic routing information or by static routing configuration) to be reachable through that port or because of default routing configuration.

Another option is the L3VPN over MPLS-TP which is similar to the L2VPN over MPLS-TP solution described above where each MS-OTN NE instantiates a Virtual Routing Function (VRF), performing L3 forwarding, instead of a VSI, performing L2 forwarding. When using the MPLS-TP L3VPN solution, a VRF, as defined in RFC 4364, is created in each MS-OTN NE for the DCN VPN instance and a full mesh of MPLS-TP LSPs is setup to connect these VRFs.

For example, with reference to FIG. 3, the GNE A receives untagged Ethernet frames encapsulating IP packets carrying DCN messages from the high-speed local Ethernet interfaces. It terminates these Ethernet frames and associates the encapsulated IP packets to the VRF assigned to the DCN VPN and forwards the packets based on their IP DA:

Packets with the IP DA equal to the GNE A control card IP address will be passed to the control card (CC) for local processing.

Packets with the IP DA equal to the NE B control IP address, if known, will be sent to the MPLS-TP LSP setup between GNE A and NE B (with a VPN label identifying the VRF assigned to the DCN VPN in NE B).

Packets with the IP DA equal to the NE C control IP address, if known, will be sent to the MPLS-TP LSP setup between GNE A and NE C (with a VPN label identifying the VRF assigned to the DCN VPN in NE C).

Packets with the IP DA equal to the NE D control IP address, if known, will be sent to the MPLS-TP LSP setup between GNE A and NE D (with a VPN label identifying the VRF assigned to the DCN VPN in NE D).

All the other packets, with unknown IP DA, will be forwarded following the default routing configuration (e.g., dropped).

The MPLS-TP packets of the LSPs setup between GNE A and NEs B, C and D are then forwarded to NE B using the ODUk connection setup between GNE A and NE B. NE B then receives MPLS-TP packets for all these LSPs and takes forwarding decision based on the LSP label at the top of the label stack:

If the label at the top of the stack identifies either the LSP setup between GNE A and NE C or the LSP setup between the GNE A and NE D, the MPLS-TP packets are forwarded to NE C using the ODUk connection setup between NE B and NE C (the MPLS-TP LSP label is swapped following standard MPLS forwarding procedures)

If the label at the top of the stack identifies the LSP setup between the GNE A and NE B, the second label (i.e., the VPN label) is used to identify to which VRF the IP packet carried within the MPLS-TP packet should be associated: in this case, it will be the VRF assigned to the DCN VPN. NE B then forwards the IP packets based on the IP DA:

Packets with the IP DA equal to the NE B control card IP address will be passed to the control card (CC) for local processing All the other packets, with unknown IP DA, will be forwarded following the default routing configuration (e.g., dropped).

This application notably assumes that interworking functions, if any, between different layer-3 protocols (e.g., interworking between OSI and IP) are implemented outside the MS-OTN DCN although nothing precludes implementing these functions also within the MS-OTN NEs.

Another possibility is to configure a packet-based VPN 302 instance within the MS-OTN to carry the DCN traffic with more flexibility in defining the rules to be used for packet-based forwarding, such as those defined in the Open Flow specification (ONF TS-025). In this case the SDN controller 200 and all the MS-OTN NE (network nodes 100) control cards reachable through the same GNEs belong to the same layer-3 network (e.g., IP or OSI CLNP) and use flexible packet forwarding mechanisms to exchange layer-3 packets at least between the MS-OTN NEs. MS-OTN NEs forward the packets/DCN messages based on flexible and configurable flow classification rules, which should at least include the layer-3 Destination Address (e.g., the IP DA) field of the layer-3 packets (e.g., IP packets).

For example, with reference to FIG. 3, GNE A receives IP packets carrying DCN traffic from the SDN controller and it would process (within the control card) those with the IP DA matching its control card IP address; forward to NE B, through the ODUk connection 103, all the other IP packets which matches some classification rules used to identify DCN traffic, with high throughput and/or low latency requirements, and forward to NE B, through the existing GCC channels, all the other IP packets. There are multiple ways to implement this option over MS-OTN networks. Any option can be used depending on the MS-OTN network capabilities and/or operator's preference.

DCN VPNs 302 need to be configured by a network management application which setup the ODUk connections 103 used to carry the DCN messages as well as the DCN VPN 302 and its forwarding rules. Since this application does not require high-throughput nor low-latency DCN forwarding, the existing DCN channels defined by current ITU-T Recommendation G.7712 (called soft control channels) can be used. Therefore, MS-OTN NEs shall support existing DCN channels (soft control channels) in addition to the new DCN channels (hard control channels) and care should be taken to avoid forwarding DCN traffic with high bandwidth and/or low latency requirements through the control card (e.g., via the GCC channels).

One possibility is to instantiate a separated DCN instance (i.e., a separated layer-3 network instance) for the applications requiring high bandwidth and/or low latency. Since the layer-3 networks are separated, all the options described above (e.g., L2VPN or L3VPN) could be used to forward DCN traffic with high-throughput and/or low-latency requirements between MS-OTN NEs.

Another possibility is to setup a shared DCN instance (i.e., a single layer-3 network instance) and to allocate different IP addresses to the functional components requiring high bandwidth and/or low latency: IP routing protocols should be properly configured to ensure traffic separation. Since the IP addresses are separated, all the option described above (e.g., L2VPN or L3VPN) could be used to forward DCN traffic with high-throughput and/or low-latency requirements between MS-OTN NEs. In case a L2VPN solution is used, the IP addresses of the functional components requiring high bandwidth and/or low latency should belong to a different IP sub-network than the IP addresses assigned to other DCN components.

Another possibility is to have both a shared DCN instance (i.e., a single layer-3 network) and shared IP addresses and to separate the different type of DCN traffic based on some flexible and configurable flow classification rules: in this case, flow forwarding rules should be properly configured to ensure traffic separation. Since the IP addresses are shared, only the latter solution based on flow-forwarding could work in this case.

All the MS-OTN NEs which are not GNE should ensure that:

The MS-OTN packet matrix does not forward any pass-through DCN traffic to the control card: only the DCN messages addressed to the MS-OTN node can be sent to the control card (to be terminated).

The control card does not forward any pass-through DCN traffic to the MS-OTN packet matrix: only the DCN traffic generated by the MS-OTN node with high-throughput and/or low-latency requirements shall be sent to the MS-OTN packet matrix.

On the GNE, the DCN traffic with high-throughput and/or low-latency requirements can be received from the SDN controller 200 either via dedicated high-speed Ethernet interfaces attached to the MS-OTN line card (while all the other DCN traffic is received via low-speed Ethernet interfaces attached to the control card) or via shared Ethernet LAN interfaces (usually the high-speed interfaces attached to the MS-OTN line cards) together with other DCN traffic. In the former case (separated Ethernet LAN interfaces), the different types of DCN traffic are separated by the SDN controller 200 (or by the WAN gateway router, if present) and the MS-OTN GNEs should only maintain traffic separation following the rules defined above for all the other MS-OTN NEs. In the latter case (shared Ethernet LAN interfaces), the MS-OTN GNE should also separate the different types of DCN traffic:

When separated DCN instances are used, the traffic belonging to different layer-3 network instances shall be logically separated (e.g., by using Ethernet VLAN tagging).

When a shared DCN instance with separated IP addresses are used, traffic separation between the two types of DCN traffic should be done based on the layer-3 DA (e.g., the IP DA). The MS-OTN GNE packet matrix shall forward all the DCN traffic addressed to the IP addresses used by remote NEs for DCN traffic with no high-throughput and/or low-latency requirements to the control card.

When a shared DCN instance with shared IP addresses is used, traffic separation between the two types of DCN traffic should be done based on flexible flow classification rules. The MS-OTN GNE packet matrix shall forward all the DCN traffic addressed to the remote NEs and with the flow classification rules matching DCN traffic with no high-throughput and/or low-latency requirements to the control card.

Figure 6:
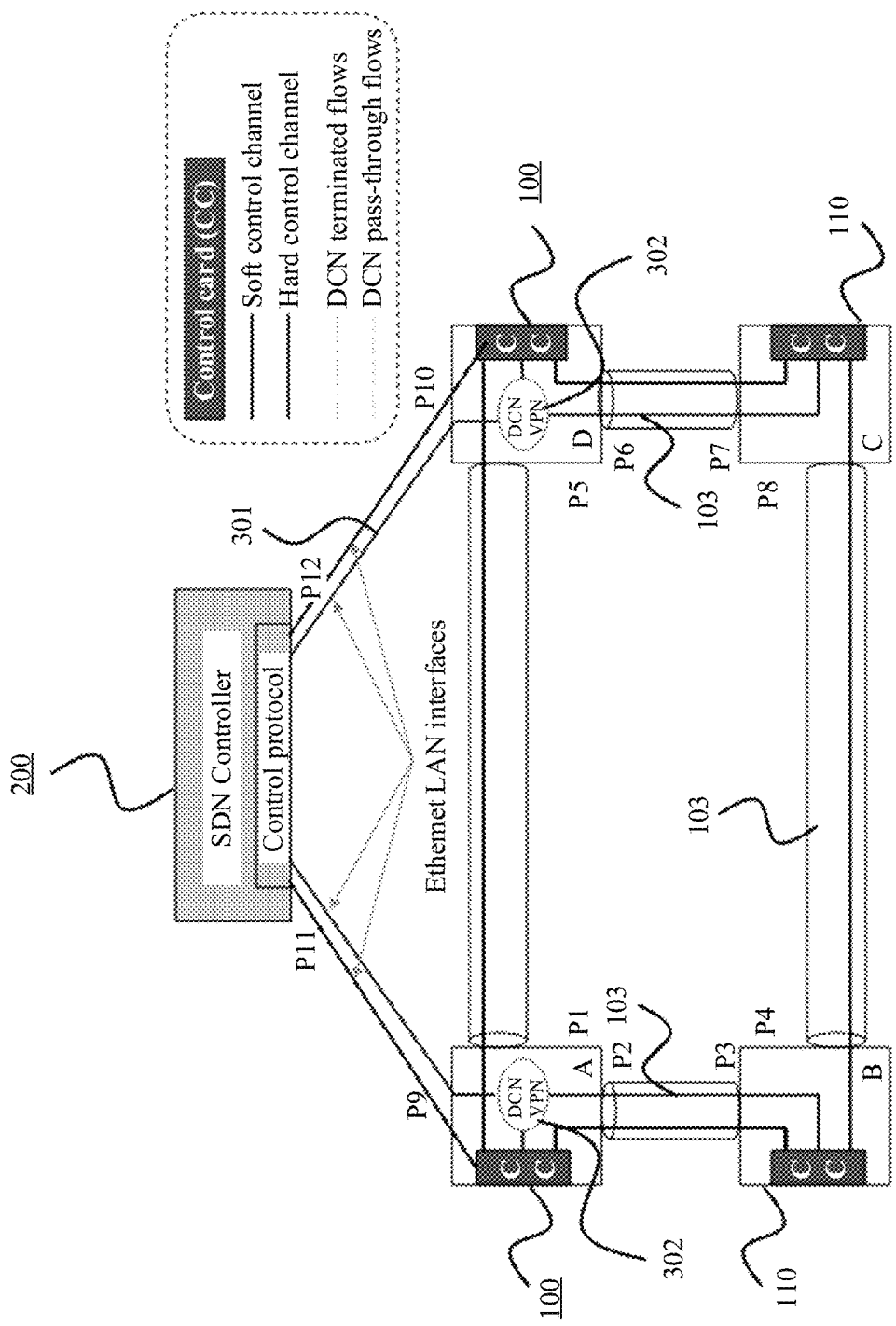
FIG. 6 shows a DCN network including network nodes and a network a device according to embodiments of the invention.

FIG. 6 shows another DCN network including network nodes 100 and a network a device 200 according to embodiments of the invention, similar as shown in FIG. 3. However, the DCN network shown in FIG. 6 includes network nodes 100 according to embodiments of the invention and other network nodes 110. In this case, where there are both network nodes 100 (here MS-OTN NEs) and network nodes 110 (OTN NEs, not being capable of forwarding DCN messages in the packet layer), it is possible to apply multi-layer DCN network design (in addition to the optional multi-layer optimization) such that:

MS-OTN NEs (i.e. network nodes 100) can forward packets/DCN traffic with high-throughput and/or low-latency requirement in the packet layer (using e.g. the DCN VPN 302 to forward packets between terminated ODUk connections 103 and/or Ethernet LAN interfaces 301)

OTN NEs (i.e. network nodes 110) can forward DCN traffic with high-throughput and/or low-latency requirements in the ODUk layer (not terminating these ODUk connections).

OTN NEs can also terminate the packets/DCN traffic addressed to their control card and carried within terminated ODUk or sub-1G OTN frames. Therefore, it is also possible to design the network with MS-OTN GNEs implementing a DCN VPN 302 to forward packets/DCN messages between the high-speed local Ethernet interfaces, the GNE control card (CC) and a set of OTN connections (either ODUk or sub-1G OTN) between the GNE and each other OTN NEs to be controller 200.

Figure 7:
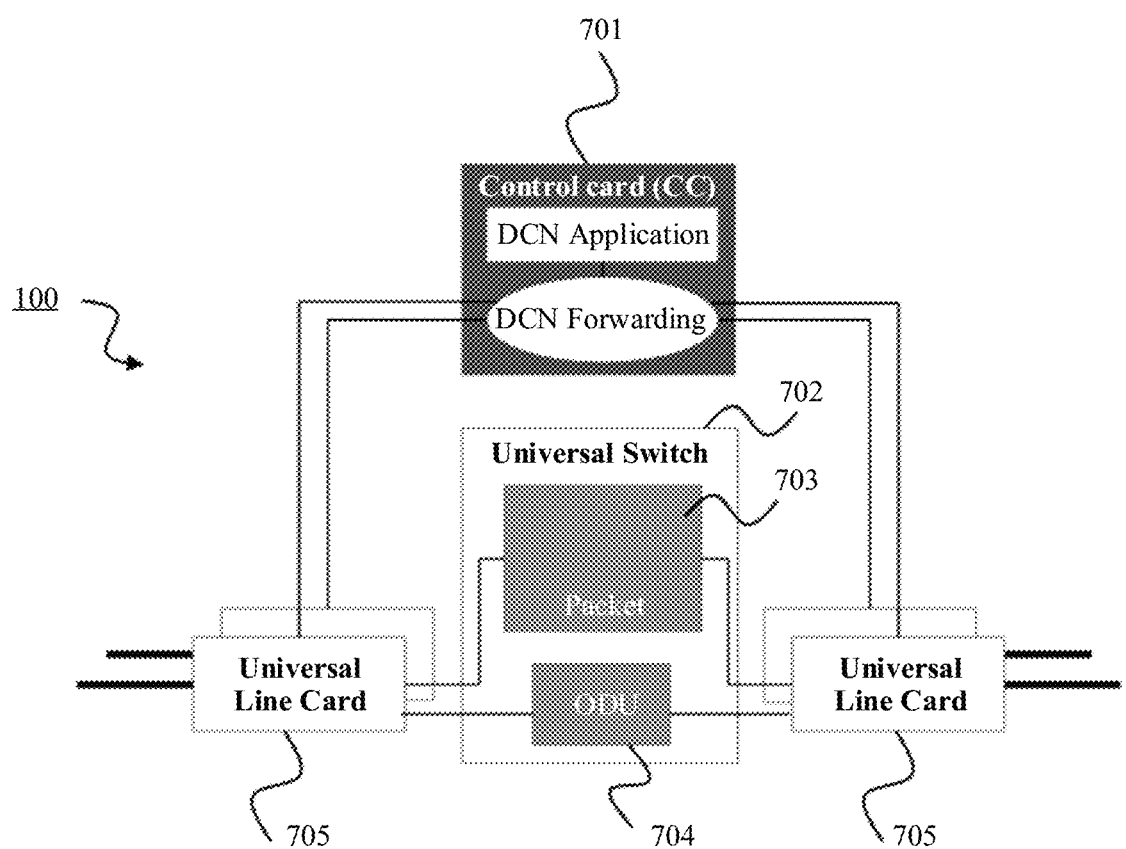
FIG. 7 shows an implementation of a network node according to an embodiment of the invention.

FIG. 7 describes an example of an MS-OTN NE implementation, i.e. an exemplary implementation of a network node 100 according to an embodiment of the invention, as e.g. described with respect to FIG. 1.

The following elements of the MS-OTN NE implementation are relevant. A switch matrix card, which is capable to switch both ODUk and packets. It can be implemented as either universal switch 702 (as shown in FIG. 7) or as two matrices on the same card: the difference is usually not visible externally to the box.

A control card 701, which is used to terminate packets/DCN messages addressed to this network node 100 and to forward other packets/DCN messages between GCC channels and/or Ethernet LAN interfaces attached to this card (soft control channels).

Line cards 705, which support OTN and Ethernet LAN interfaces. MS-OTN can support universal line cards (where both OTN and Ethernet LAN interfaces can be attached) and/or a mix of dedicated packet line cards (where only Ethernet LAN interfaces can be attached) and OTN line cards (where only OTN interfaces can be attached).

A key characteristics is that the network node 100 can support both OTN and Ethernet LAN interfaces and can switch the traffic between these interfaces at either ODUk or packet layers. In this example, an implementation based on a universal line card 705 and a universal switch 702 is explained.

Figure 8:
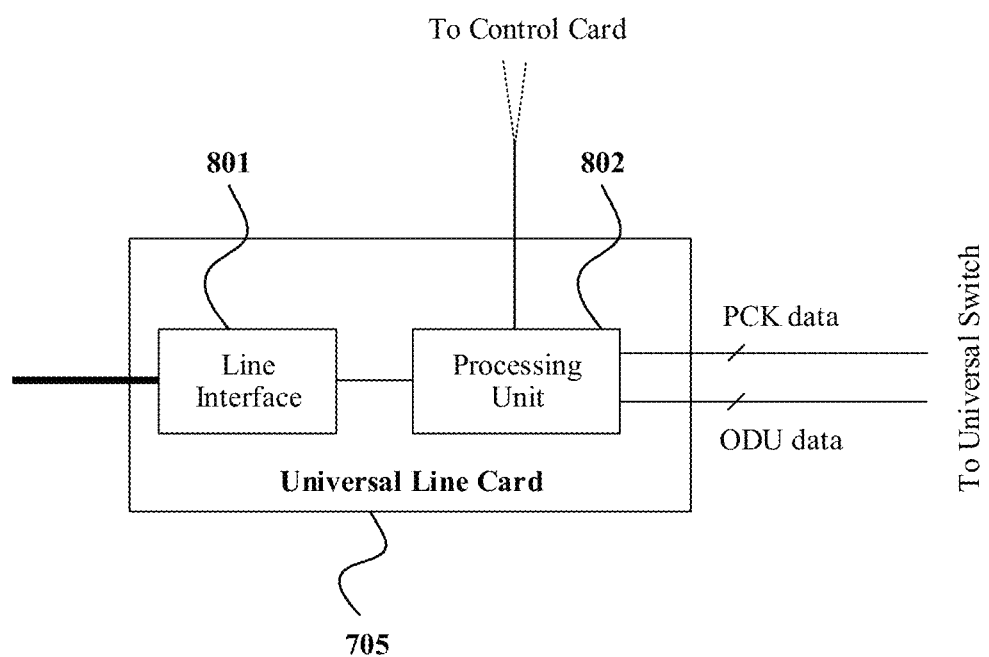
FIG. 8 shows an implementation of a line card of a network node according to an embodiment of the invention.

FIG. 8 describes examples of the components of a universal line card 705. The Line Interface 801 component terminates OTN and/or Ethernet LAN interfaces. The traffic for the interfaces attached to the same line card 705 is processed by the same Processing Unit 802. The Processing Unit 802 will process the traffic (e.g., Ethernet and/or ODUk frames) received from the line, as specified in relevant standards, understand to which connection (packet-based or ODUk) the traffic belongs to and decide how it has to be further processed. The traffic to be forwarded will be passed to either the Packet or the ODUk Switching Unit (Universal Switch 702), together with the information needed to properly forward it toward the egress: the packet traffic is passed to the Packet Switching Unit 703 while ODUk traffic is passed to the ODUk Switching Unit 704. The Processing Unit 802 also extracts the DCN traffic from the ODUk GCC channels and send it to the Control Card. The Processing Unit 802 is also responsible to properly formatting the egress traffic, received from the Switching Units, for being transmitted toward the line. The Processing Unit 802 also forwards the DCN traffic received from the Control Card within the GCC channels.

In order to implement the network node 100, the Processing Unit 802 should be configured to understand which packets 101 received from the line (either from the Ethernet LAN interfaces or from a terminated ODUk connection within an OTN interface) carry DCN traffic and either based on the MAC DA field (L2VPN implementation option) or on the IP DA field (L3VPN implementation option) or on flexible flow classification rules (flow-based VPN option). These packets 101 are sent to the Packet Switching Unit, together with the information needed to properly forward it toward the egress, as if they were user packets. The terminated DCN messages can be forwarded to the control card either by the universal switch or by the Processing Unit. This is an internal implementation decision not visible from the outside of the network node 100.

Figure 9:
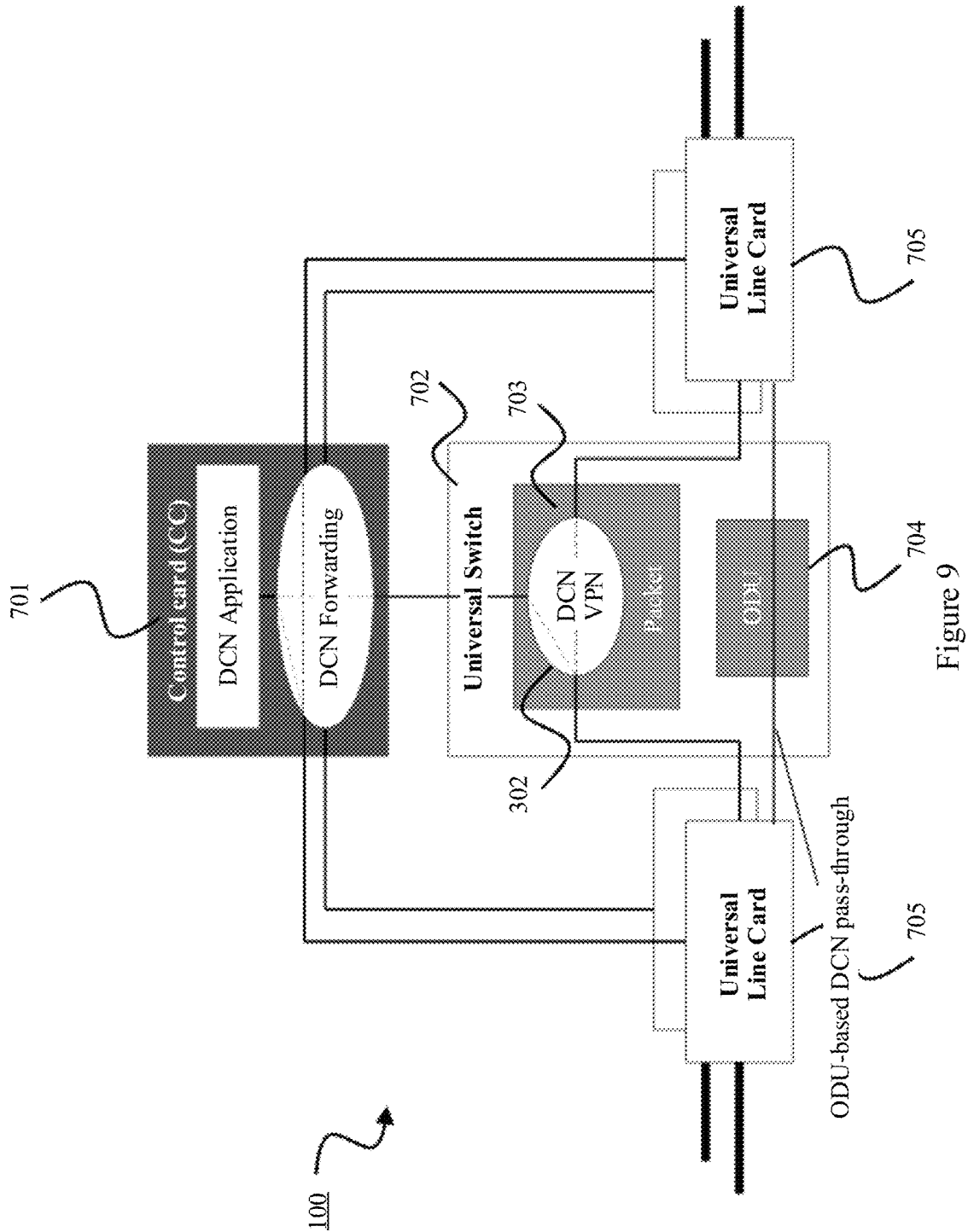
FIG. 9 shows an implementation of a network node according to an embodiment of the invention.

Within the control card, the "DCN Application" is responsible to process the terminated DCN messages while the "DCN Forwarding" component is responsible to send terminated DCN messages to the "DCN Application" component and to forward pass-through DCN messages towards other GCC channels and/or Ethernet LAN interfaces attached to the Control Card. FIG. 9 describes all the possible ways packets/DCN traffic can be forwarded through an MS-OTN NE (network node 100) according to an embodiment of the invention.

Figure 10:
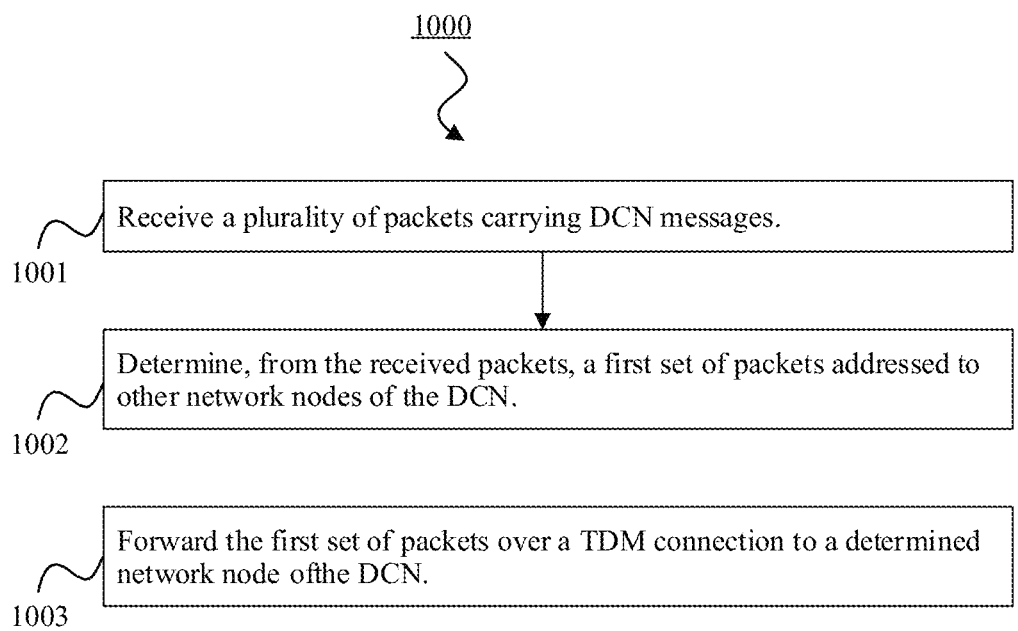
FIG. 10 shows a method according to an embodiment of the invention.
Figure 11:
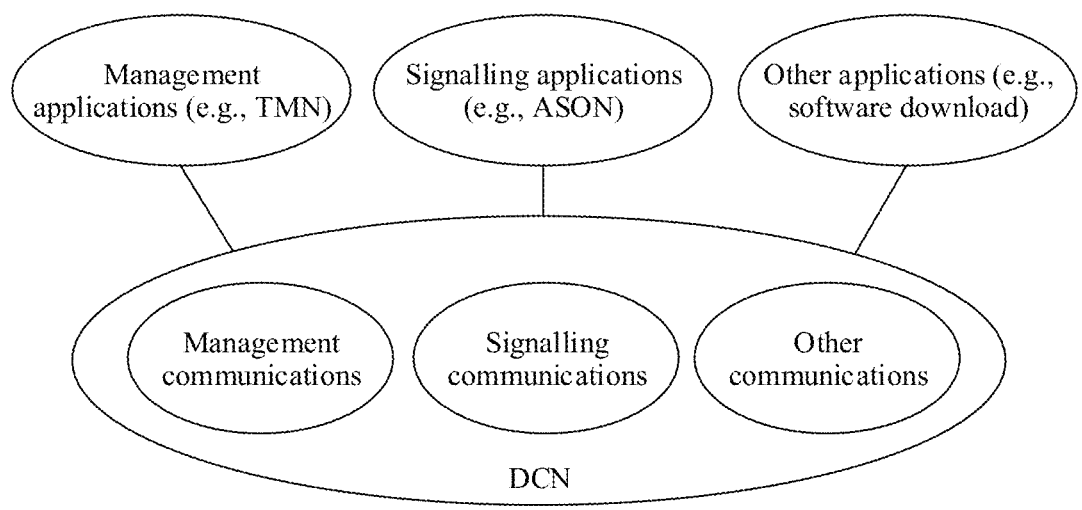
FIG. 11 shows example application supported by a DCN.
Figure 12:
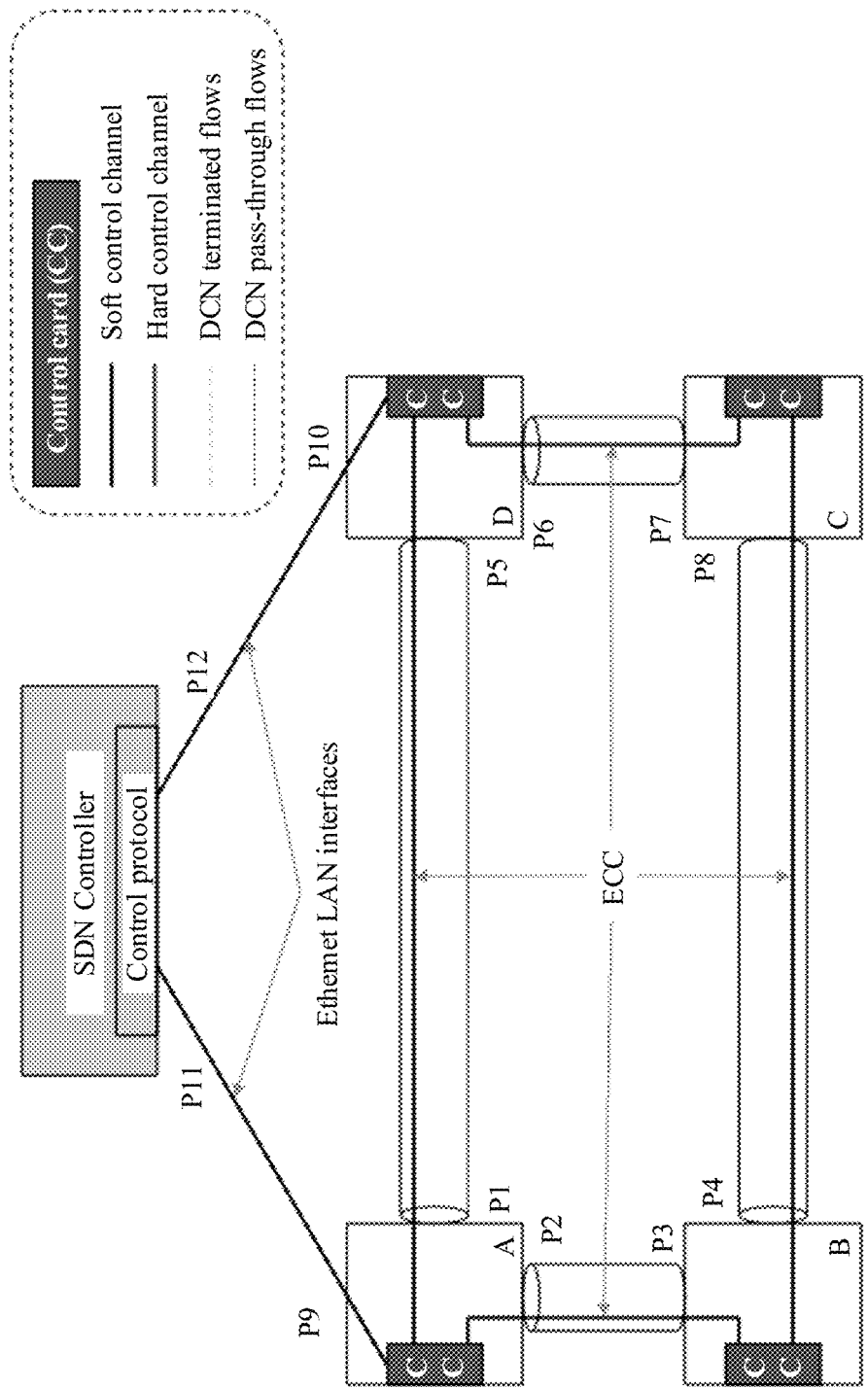
FIG. 12 shows an exemplary DCN network.

FIG. 10 shows a method 1000 according to an embodiment of the invention. The method 1000 can be performed at a network node 100, e.g. the network node 100 shown in FIG. 1, FIG. 3 or FIG. 6. The method 1000 includes: a step 1001 of receiving a plurality of packets 101 carrying DCN messages, a step 1002 of determining 1002, from the received packets 101, a first set 102 of packets 101 addressed to other network nodes of the DCN, and step 1003 of forwarding the first set 102 of packets 101 over a TDM, connection 103 to a determined network node 110 of the DCN.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A network node for a Data Communication Network (DCN), wherein the network node comprises:
  a processor; and
  a memory coupled to the processor and having processor-executable instructions stored thereon, which are executed by the processor and cause the network node to:
    receive a plurality of packets carrying DCN messages;
    determine, from the received packets, a first set of packets addressed to other network nodes of the DCN and not addressed to the network node; and forward the first set of packets over a Time-Division-Multiplexing (TDM) connection to a determined network node of the DCN.

2. The network node according to claim 1, wherein the processor is further configured to:
determine, from the received packets, a second set of packets addressed to an external network controller; and
forward the second set of packets over an Ethernet connection to the external network controller or other external network device.

3. The network node according to claim 2, wherein the processor is further configured to:
receive packets over a TDM connection from another determined network node of the DCN.

4. The network node according to claim 3, wherein the processor is further configured to:
determine and forward a set of packets using a packet matrix.

5. The network node according to claim 2, wherein the processor is further configured to:
receive packets over an Ethernet connection, from an external network controller or other external network device.

6. The network node according to claim 1, wherein the processor is further configured to:
receive packets over a TDM connection from another determined network node of the DCN.

7. The network node according to claim 6, wherein the processor is further configured to:
determine and forward a set of packets based on a packet-based Virtual Private Network (VPN).

8. The network node according to claim 1, wherein the processor is further configured to:
receive packets over an Ethernet connection, from an external network controller or other external network device.

9. The network node according to claim 1, wherein:
a TDM connection is an Optical Data Unit-k (ODUk) connection.

10. The network node according to claim 1, wherein the processor is further configured to:
determine and forward a set of packets using a packet matrix.

11. The network node according to claim 1, wherein the processor is further configured to:
determine and forward a set of packets based on a packet-based Virtual Private Network (VPN).

12. The network node according to claim 11, wherein:
the packet-based VPN includes a flow-based VPN, in particular a layer-2 VPN or a layer-3 VPN.

13. The network node according to claim 1, wherein the processor is further configured to:
separate a set of packets into first packets carrying high throughput and/or low latency DCN messages, and second packets carrying other DCN messages; and
forward only the first packets over the TDM connection or an Ethernet connection.

14. The network node according to claim 13, wherein the processor is further configured to:
separate the set of packets based on at least one of the following (a), (b) and (c):
(a) separated layer-3 network instances;
(b) a separated IP address space within a shared layer-3 network instance; and
(c) one or more packet classification rules.

15. A network device for providing Data Communication Network (DCN) traffic to a DCN, wherein the network device comprises:
a processor; and
a memory coupled to the processor and having processor-executable instructions stored thereon, which are executed by the processor and cause the network device to:
separate packets carrying DCN messages into first packets carrying high throughput and/or low latency DCN messages, and second packets carrying other DCN messages based on at least one of the following (a), (b) and (c):
(a) separated layer-3 network instances;
(b) a separated IP address space within a shared layer-3 network instance; and
(c) one or more packet classification rules;
provide the first packets over a higher-speed connection, to a determined network node of the DCN; and
provide the second packets over a lower-speed connection, to the determined network node of the DCN.

16. The network device according to claim 15, wherein:
the network device is a network controller, a Software Defined Networking (SDN) controller, or a router.

17. The network device according to claim 15, wherein the first packets are provided over an Ethernet connection; and/or the second packets are provided over an Ethernet connection.

18. A method performed at a network node of a Data Communication Network (DCN), the method comprising:
receiving a plurality of packets carrying DCN messages;
determining, from the received packets, a first set of packets addressed to other network nodes of the DCN and not addressed to the network node; and
forwarding the first set of packets over a Time-Division-Multiplexing (TDM) connection to a determined network node of the DCN.

* * * * *

UNITED STATES PATENT AND TRADEMARK OFFICE
CERTIFICATE OF CORRECTION

| | |
|---|---|
| PATENT NO. | : 11,855,806 B2 |
| APPLICATION NO. | : 17/479797 |
| DATED | : December 26, 2023 |
| INVENTOR(S) | : Busi et al. |

It is certified that error appears in the above-identified patent and that said Letters Patent is hereby corrected as shown below:

In the Claims

Claim 12: Column 19, Lines 50-51: "the packet-based VPN includes a flow-based VPN, in particular a layer-2 VPN or a layer-3 VPN." should read -- the packet-based VPN includes a flow-based VPN, a layer-2 VPN or a layer-3 VPN. --.

Signed and Sealed this
Twenty-sixth Day of March, 2024

Katherine Kelly Vidal
*Director of the United States Patent and Trademark Office*